R. KLINE & R. M. JACK.
Running-Gears for Carriages.
No. 139,164.  Patented May 20, 1873.
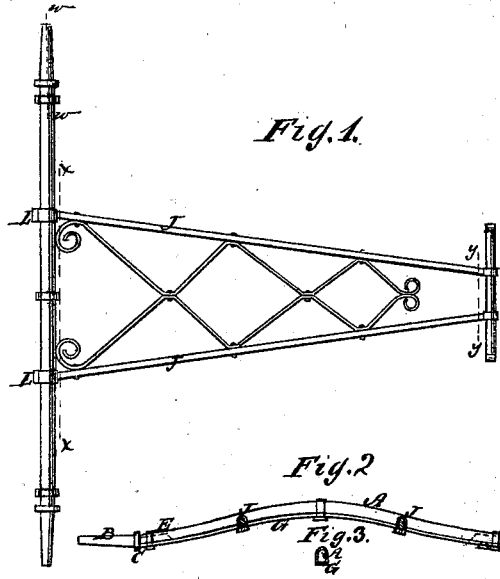
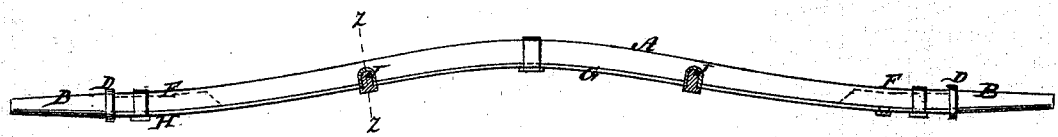
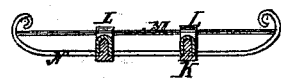
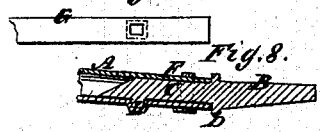
Witnesses:
E. Wolff.
Chuquiek
Inventor:
R. Kline
R. M. Jack
PER
Attorneys.
AM. PHOTO-LITHOGRAPHIC CO. N.Y. (OSBORNE'S PROCESS.)

UNITED STATES PATENT OFFICE.

RUFUS KLINE AND ROBERT M. JACK, OF POTTSTOWN, PENNSYLVANIA, ASSIGNORS OF ONE-THIRD THEIR RIGHT TO FORTUNATO G. POMPEJI, OF SAME PLACE.

IMPROVEMENT IN RUNNING-GEARS FOR CARRIAGES.

Specification forming part of Letters Patent No. 139,164, dated May 20, 1873; application filed November 25, 1872.

*To all whom it may concern:*

Be it known that we, RUFUS KLINE and ROBERT M. JACK, of Pottstown, in the county of Montgomery and State of Pennsylvania, have invented a new and useful Improvement in Wagons, of which the following is a specification:

The invention consists in the improvement of a wagon running-gear, as hereinafter described and pointed out in the claims.

Figure 1 is a plan view of an axle-perch and bolster constructed according to our invention. Fig. 2 is a side elevation. Fig. 3 is a transverse section. Fig. 4 is a section of the perch on the line $x\ x$ and side elevation of the axle. Fig. 5 is a section of the perch on the line $y\ y$ and side elevation of the bolster. Fig. 6 is a section of the axle and part of the perch on the line $z\ z$ of Fig. 4. Fig. 7 is a plan of part of the tension-strap for bracing the axle; and Fig. 8 is a longitudinal section of part of the axle, taken on the line $w\ w$ of Fig. 1.

Similar letters of reference indicate corresponding parts.

A is the main part of the axle, which is formed of the inverted U-shaped bar, arched in the middle, as shown in Figs. 3 and 4. B represents the spindles or journals, made of separate short bars, with a shank, C, behind a collar, D, adapted to fit in the ends of the bar A. These shanks will, in some cases, be welded to the bar A, as represented at E, and in others will be fitted in separately and fastened by a clip, as shown at F. G is the thin plate extending from collar to collar under the part A, and either welded to the shanks of the spindles, as at H, or fastened by a stud-pin and socket, I, or other equivalent device, and a clip, F. This bar or plate G is so adjusted as to length that it holds the collars C firmly against the ends of the main part of the axle, and its tensile strength is brought to the aid of the main part of the axle in support of the load. J represents the bars of the perch or reach, of which there may be one or more, which I also propose to make in the same form in cross-section as the part A of the axle, employing filling-pieces K at the ends, welded in to attach the clips L for connecting the bars to the axle and the bolster. M is the bolster, which I also propose to make of an inverted U-shaped bar of the same kind as employed for the axle and the reach, with a thin flat plate, N, upon the bottom fastened to it by clips.

We are aware that axles made of thin hollow U-shaped plate-metal, U-shaped perches made with a welded filling, and bolsters made with U-shaped piece of metal, are not broadly new; we therefore desire to disclaim them.

What we claim, and wish to protect and secure by Letters Patent, is—

1. The combination, with a U-shaped metallic axle, of a subjacent strip, welded to the under side of each journal, as and for the purpose described.

2. The U-shaped thin metallic perch-plates J, filling-pieces K, and clips L, combined as and for the purpose set forth.

3. The U-shaped plate M and flat plate N, constructed and combined with clips, as and for the purpose specified.

RUFUS KLINE.
ROBERT M. JACK.

Witnesses:
FORTUNATO G. POMPEJI,
D. F. REINERT.